June 28, 1966   J. R. B. WALKDEN   3,258,104
CONVEYING AND FEEDING GLASS ARTICLES INTO A LEHR
Filed March 19, 1964   11 Sheets-Sheet 1

INVENTOR.
JOHN R. B. WALKDEN
BY
E. J. Holler &
W. A. Schaich
ATTORNEYS

June 28, 1966  J. R. B. WALKDEN  3,258,104
CONVEYING AND FEEDING GLASS ARTICLES INTO A LEHR
Filed March 19, 1964  11 Sheets-Sheet 9

United States Patent Office

3,258,104
Patented June 28, 1966

3,258,104
CONVEYING AND FEEDING GLASS
ARTICLES INTO A LEHR
John R. B. Walkden, Toledo, Ohio, assignor to Owens-
Illinois Inc., a corporation of Ohio
Filed Mar. 19, 1964, Ser. No. 353,114
11 Claims. (Cl. 198—31)

This invention relates to the handling of glass articles and particularly glass articles which are hot from a sealing or forming operation. More specifically the invention relates to the transfer of articles such as television tube bulbs from a sealing machine to a lehr.

In the forming of glass articles such as the sealing of two or more parts to produce a glass article, it is necessary to substantially immediately heat treat the article in a lehr to prevent stresses from forming therein. In the making of glass articles such as television tube bulbs by heat sealing a faceplate to a funnel-neck assembly, it has been conventional to seal the two parts in a sealing machine and manually transfer the resultant bulb to a lehr. This transfer must take place within a predetermined interval of time, otherwise stresses are produced in the bulb which result in its breakage. It is thus extremely difficult for an operator to operate a plurality of sealing machines and at the same time insure that the resultant formed articles will be transferred to the lehr quickly enough. A further problem with such an operation is that the manual positioning of a heavy article such as a television tube bulb in the lehr is somewhat erratic and results in a non-uniform heating of one television tube bulb relative to another. This may also result in breakage of the television tube bulbs in the lehr.

It is an object of this invention to provide an apparatus for automatically conveying glass articles such as television tube bulbs and the like from a sealing operation to a lehr in proper timed sequence and within a predetermined period of time.

It is a further object of this invention to provide an apparatus for feeding such glass articles through a lehr in accordance with a predetermined pattern so that although the articles are positioned transversely of the lehr the mean time difference required to load successive articles is substantially equal thereby insuring substantially the same heat treatment for all of the glass articles.

It is a further object of the invention to provide an apparatus wherein an operator can deposit a television tube bulb or the like at a loading platform and return to operation of his machines without waiting for a position on the loading apparatus for the article, the apparatus automatically transferring the article to a loading conveyor when a position is available.

In the drawings:

FIG. 3 is a fragmentary elevational view taken along the line 3—3 in FIG. 2.

FIG. 6 is a fragmentary end view on an enlarged scale of a portion of the apparatus shown in FIG. 1.

FIG. 9 is a fragmentary plan view on an enlarged scale of another portion of the apparatus shown in FIG. 1.

*General description*

Figure 1:
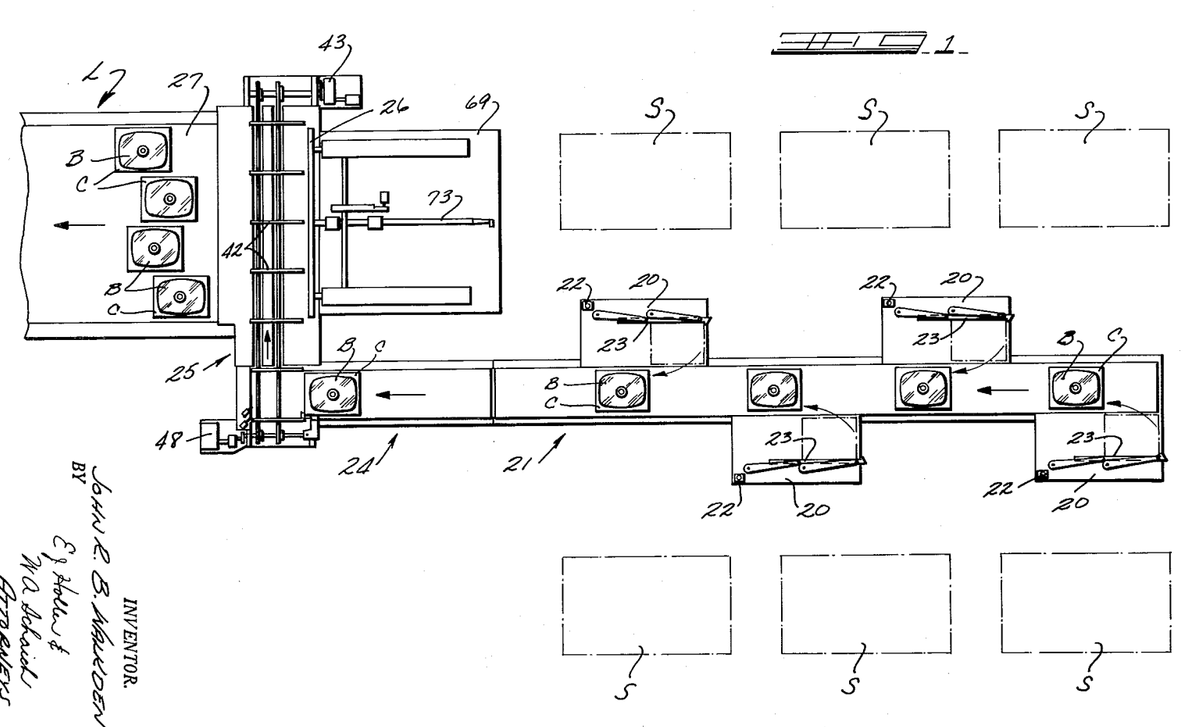
FIG. 1 is a fragmentary plan view of an apparatus embodying the invention, parts being broken away.

Referring to FIG. 1, the invention relates to the handling of glass articles which are removed by operators from sealing machines S and are to be transferred to a lehr L. The invention has particular utility when utilized in the handling of television tube bulbs (FIG. 6) which have a faceplate sealed to a funnel-neck assembly.

In accordance with the invention an operator removing the hot television tube bulbs B from sealing machines S deposits each bulb B on a tray or carrier C (FIG. 2) which is positioned on a loading platform 20 that comprises one of a plurality of platforms 20 alongside an endless loading conveyor 21. Four loading stations are shown in the drawings.

The operator depresses a conditioning button 22. At periodic intervals, pusher bars 23 at the platforms 20 are actuated, provided that the buttons 22 have been depressed, to move the carrier C and, in turn, the television tube bulb B thereon onto the loading conveyor 21. The periodic operation of the pusher bars 23 is controlled, as hereinafter described, such that the time interval is sufficient to permit the last of the television tube bulbs B to pass the platform 20 which is nearest the lehr L.

The loading conveyor 21 delivers each carrier C to a decelerating conveyor 24. The declerating conveyor 24, in turn, delivers each carrier C with a television tube bulb B thereon to a cross conveyor 25 that is operated periodically to bring the carrier C and the bulb B into a predetermined position adjacent the end of the lehr L. When the cross conveyor 25 has moved the carrier C with the bulb B thereon to a predetermined position transversely of the lehr L, a pusher 26 is operated to transfer the carrier C from the cross conveyor 25 to the conveyor 27 of the lehr L.

The timing of the cross conveyor 25 is such that the interval of time between the transfer of each carrier C and bulb B is averaged out so that every bulb B will be delivered to the lehr within a predetermined period of time.

As will be more clear hereinafter, the cross conveyor 25 is operated to move, for example, one carrier C to the far side of the lehr, the second carrier C to near side of the lehr, the third carrier C to the far side of the lehr and the fourth carrier C to the near side of the lehr. This is evident from the longitudinal staggering due to the lehr movement as shown in FIG. 1.

*Conveying apparatus*

Figure 2:
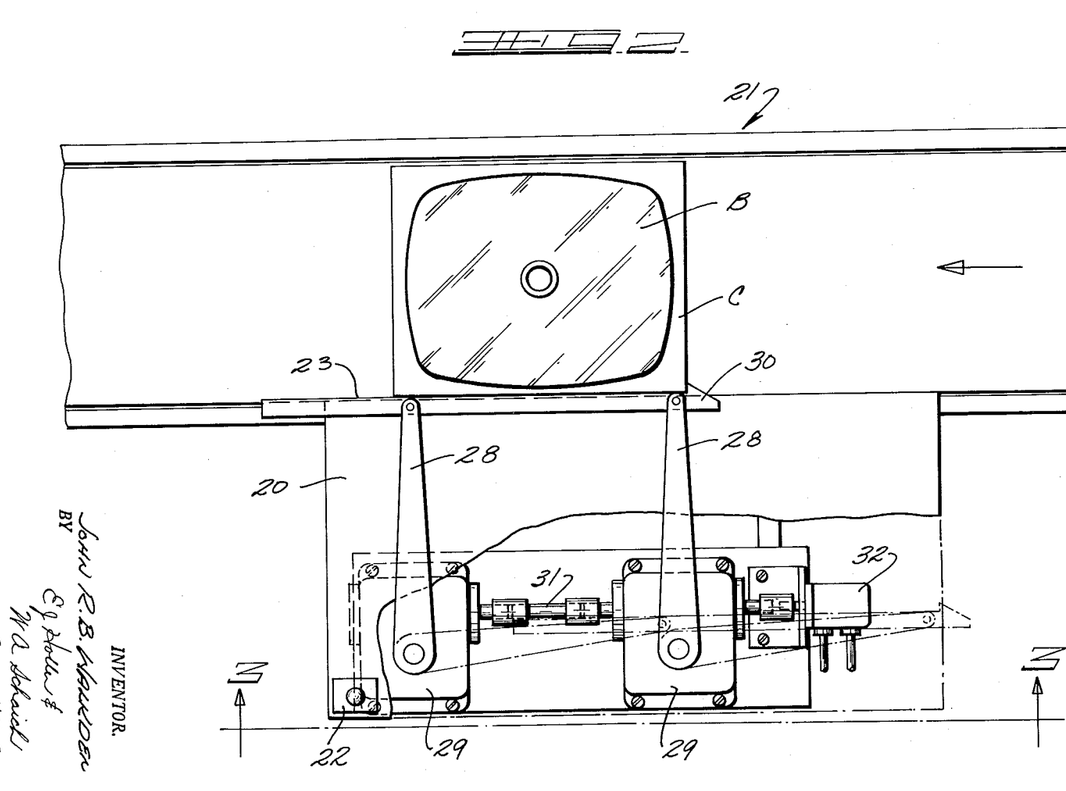
FIG. 2 is a fragmentary plan view on an enlarged scale of a portion of the apparatus shown in FIG. 1, parts being broken away.

Referring to FIGS. 2 and 3, the loading platform 20 at each loading station along loading conveyor 21 is substantially flat and the pusher bar 23 is mounted on parallel arms 28 which are mounted on and operated in unison by gear boxes 29 to swing the pusher bar 23 from the dotted line position shown in FIG. 2 to the full line position shown in FIG. 2. In the dotted line position, one end of pusher bar 23 is formed with a hook 30 that engages the end of the carrier C.

When the arms 28 are operated, the pusher bar is swung inwardly toward the loading conveyor 21 and in the direction of movement of the loading conveyor 21 to quickly move the carrier C and television tube bulb B thereon onto the loading conveyor 21.

As shown in FIGS. 2 and 3, the gear boxes 29 are interconnected by a driving connection 31 and are driven by a reversible hydraulic motor 32, which can be of the vane type, to swing the arms 28 from an initial position to a position adjacent the loading conveyor 21.

Figures 2, 4:
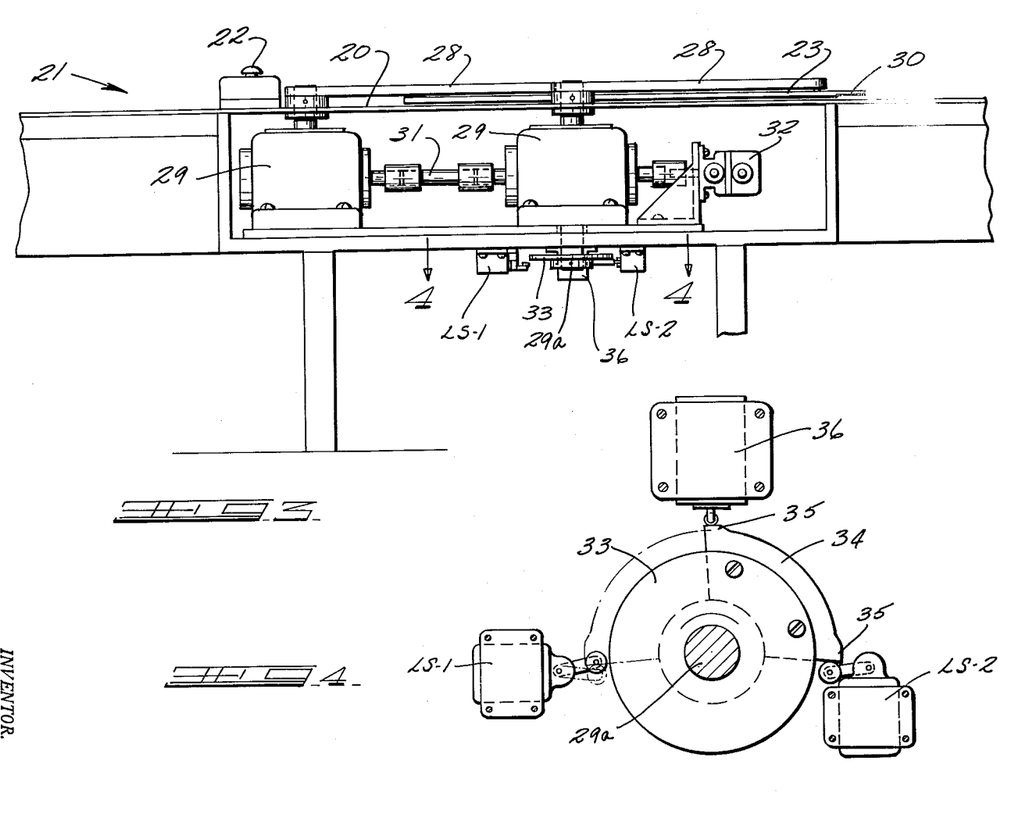
FIG. 4 is a sectional view on an enlarged scale taken along the line 4—4 in FIG. 3.

As shown in FIG. 4, a plate 33 is mounted on a shaft 29a projecting downwardly from one of the gear boxes 29 and has a cam 34 thereon which operates limit switches LS2 and LS1. As hydraulic motor 32 is operated to swing the arms 28 and, in turn, the pusher bar 23 toward the loading conveyor 21, the cam 34 engages limit switch LS1 to reverse the flow of hydraulic fluid to the motor 32. Upon return of the arms 28, the cam 34 engages limit switch LS2 to stop the flow of hydraulic fluid to the motor 32.

Figure 12:
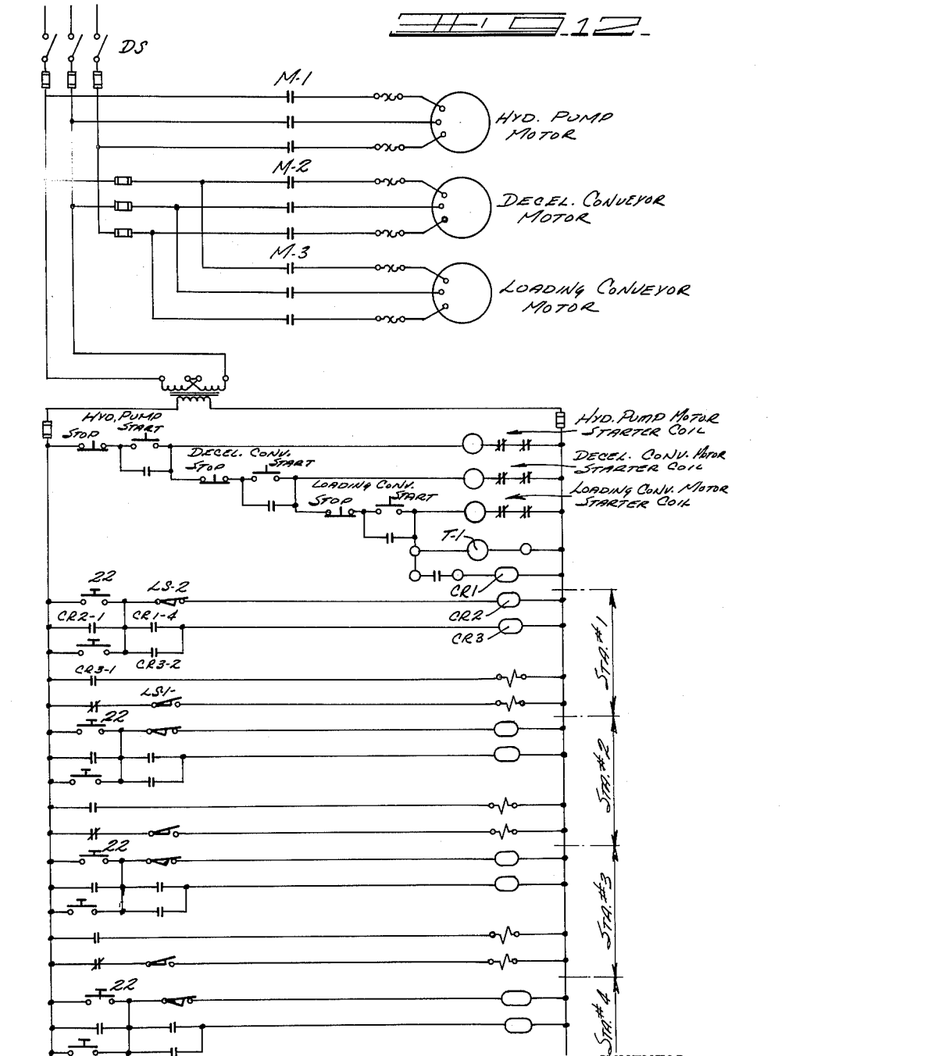
FIG. 12 is a schematic diagram of a portion of the electrical circuit utilized in the apparatus.
Figure 15:
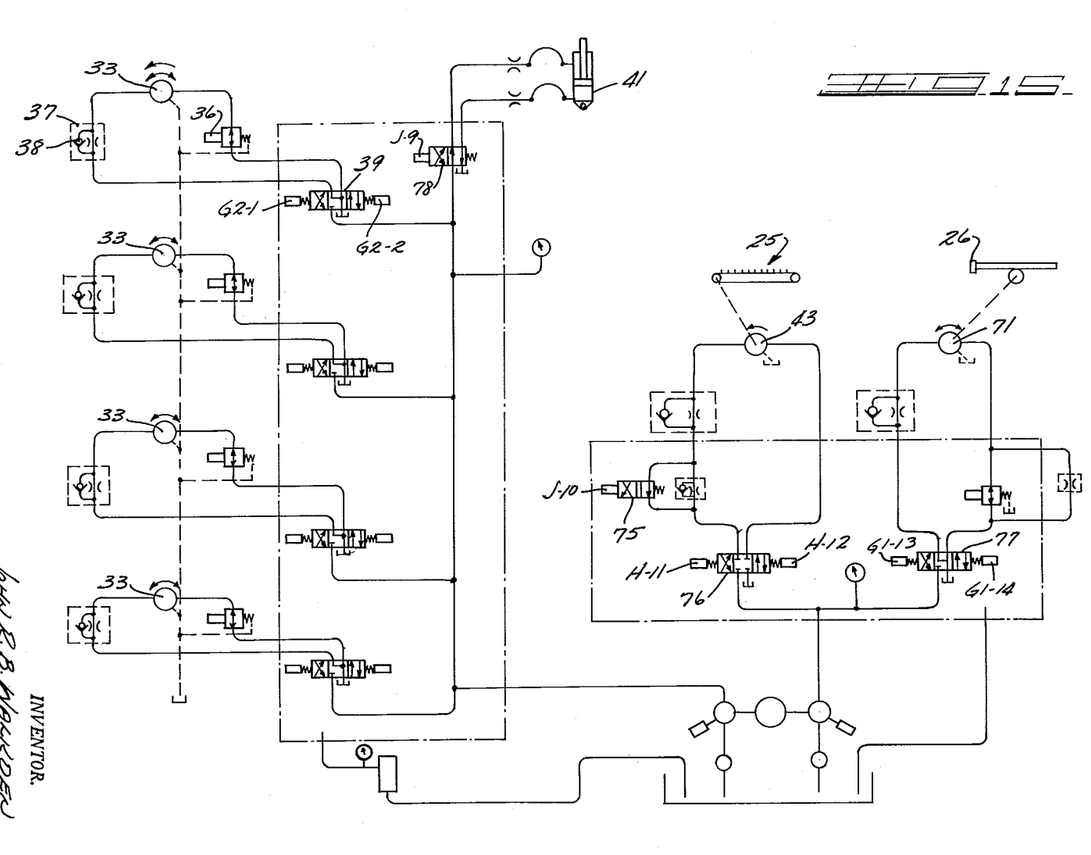
FIG. 15 is a schematic diagram of the hydraulic circuit utilized in the apparatus.

The manner in which the movement of the pusher bar 23 is interconnected and controlled by the conditioning button 22 can be more readily understood by reference to the hydraulic circuit shown in FIG. 15 and the electrical circuit shown in FIG. 12. As shown in FIG. 12, when the master switch DS is closed, the hydraulic pump motor, the decelerating conveyor motor and the loading conveyor motor are energized. Appropriate starting and stopping switches are provided for each of these motors.

When an operator places a television tube bulb B on a carrier C on a platform 20, he depresses a conditioning switch 22 which conditions the circuit so subsequently upon control of the timer T1, the hydraulic motor 33 at that particular loading station will be energized to move the pusher bar 23 and transfer the carrier C and bulb B to the loading conveyor 21.

Referring to FIG. 12, the depression of conditioning switch 22 momentarily energizes relay CR2. At this time limit switch LS2 is closed (FIG. 4). The momentary energization of relay CR2 causes contacts CR2–1 to close so that when the sequence timer T1 applies current, relay CR3 is energized. Energization of relay CR3 closes contacts CR3–1 and energizes solenoid G2–1 shifting the four-way valve 39 so that the hydraulic motor 33 is operated to move the pusher bar 23 toward the conveyor 21. At the same time contacts CR3–2 are closed to maintain relay CR3 closed. As the pusher bar 23 reaches its position adjacent to loading conveyor 21, limit switch LS1 is closed thereby energizing solenoid G2–2 to shift the valve and operate the hydraulic motor 33 in the reverse direction. When the pusher bar 23 reaches its initial position, limit switch LS2 is closed. The timer T1 has maintained relay CR1 closed, thereby closing contacts CR1–4 for a predetermined interval of time so that the hydraulic motor 33 cannot again be energized until push button 22 is once again depressed.

As shown in FIG. 4, the ends of the cam 34 are raised at 35 to actuate a deceleration valve 36 decelerating the movement of the pusher bar 23 as it reaches its poistion nearest the loading conveyor 21 or its initial position. Deceleration valve 36 is shown diagrammatically in FIG. 15. In addition, a variable pressure compensated flow control valve 37 is provided in the circuit of motor 33 so that the speed of movement of the pusher bar 23 toward the loading conveyor 21 can be adjusted. Valve 37 includes the bypass 38 so that the return movement of pusher bar 23 is at full speed.

As shown in FIGS. 12 and 15, the control circuits for each of the four loading stations are substantially identical and only one will be described, for purposes of clarity.

In summary, it can be seen that all of the pusher bars 23 are actuated simultaneously provided that the conditioning button 22 at each loading platform 20 has been depressed. Only those of the pusher bars 23 will be operated simultaneously as may have their corresponding push buttons 22 depressed.

In practice, the timer T1 is energized to actuate relay CR1 for a short interval of time and to de-energize the relay CR1 for a length of time sufficient to permit all of the carriers C to clear the loading stations, assuming that a carrier C has been pushed on the loading conveyor 21 at each station.

*Lehr loading apparatus*

The loading conveyor 21 delivers each carrier C with television tube bulb B thereon to deceleration conveyor 24 that is driven continuously and feeds each carrier C to the cross conveyor 25. If the cross conveyor 25 is operating, a latch 40 controlled by a hydraulic cylinder 41 is interposed in the path of the carrier C to prevent it from moving onto the cross conveyor 25. Thus, one or more carriers C can accumulate on the deceleration conveyor 24. Carriers C are constructed such that if they abut one another, the bulbs B will not come into contact.

Figure 5:
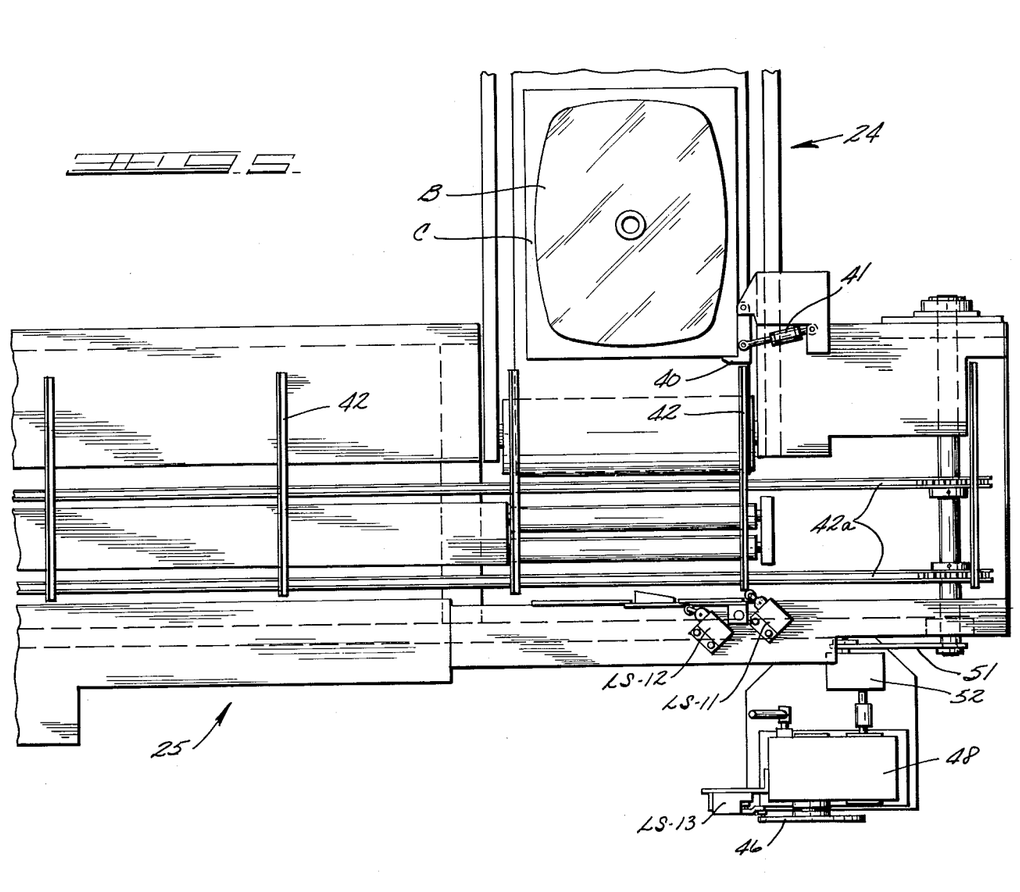
FIG. 5 is a fragmentary plan view on an enlarged scale of another portion of the apparatus shown in FIG. 1.
Figure 7:
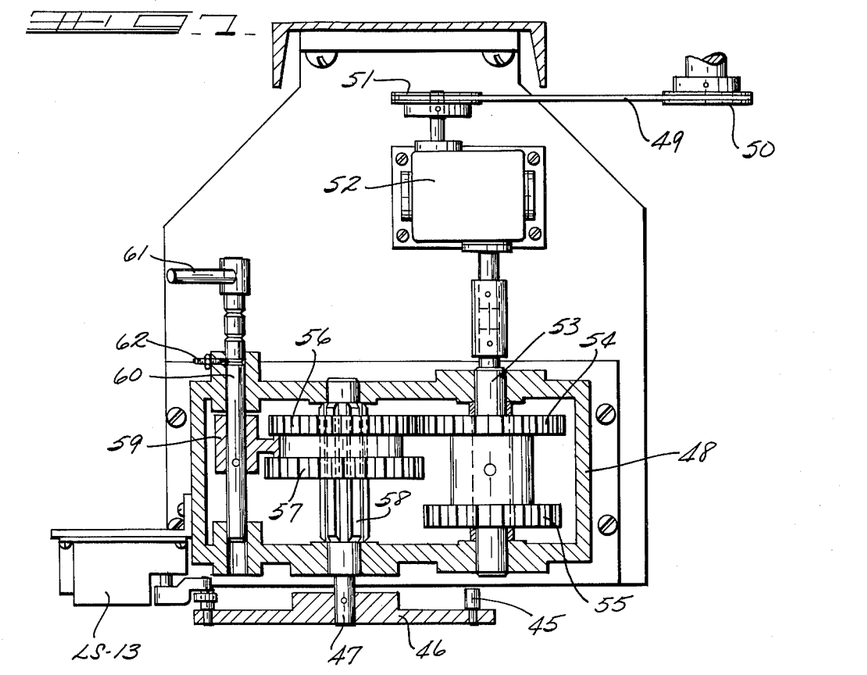
FIG. 7 is a fragmentary part sectional plan view of a portion of the apparatus shown in FIG. 6.

As shown in FIGS. 5 and 6, cross conveyor 25 comprises endless chains 42a which support flight bars 42. Conveyor 25 is driven intermittently by a hydraulic motor 43 through an endless chain 44. The hydraulic motor 43 is controlled in its movement by a limit switch LS13 that is successively actuated by pins 45 on disc 46 that is fixed to a shaft 47 journalled in a housing 48. Disc 46 is operatively connected to the conveyor 25 so that it moves therewith through a chain 49 trained over sprockets 51, a gear box 52 and a transmission within housing 48. The transmission within housing 48 comprises a shaft 53 journalled therein and coupled with the output of gear box 52 and having gears 54, 55 fixed thereto. Shaft 47 within housing 48 has gears 56, 57 mounted on a hub and having a spline connection with a spline 58 on shaft 47. An actuator 59 is provided for shifting the hub supporting the gears 56, 57 axially on the spline 58 to shift the transmission so that the shaft 47 is driven either through gears 54, 56 or gears 55, 57. In this manner, the ratio of rotation of the disc 46 with respect to operation of the conveyor 25 can be changed to accommodate either different transverse arrangements of the carriers C in the lehr or different flight bar distances on the conveyor 25. The actuator 59 is mounted on a shaft 60 which can be moved manually axially by engaging a handle 61 thereon after releasing a set screw 62.

Referring to FIG. 5, as a carrier C moves into position between the flight bars 42 from the deceleration conveyor 24, it actuates a limit switch LS12 to initiate a cycle of operations, as presently described. At this point, a flight bar 42 engages a limit switch LS11.

Figure 10:
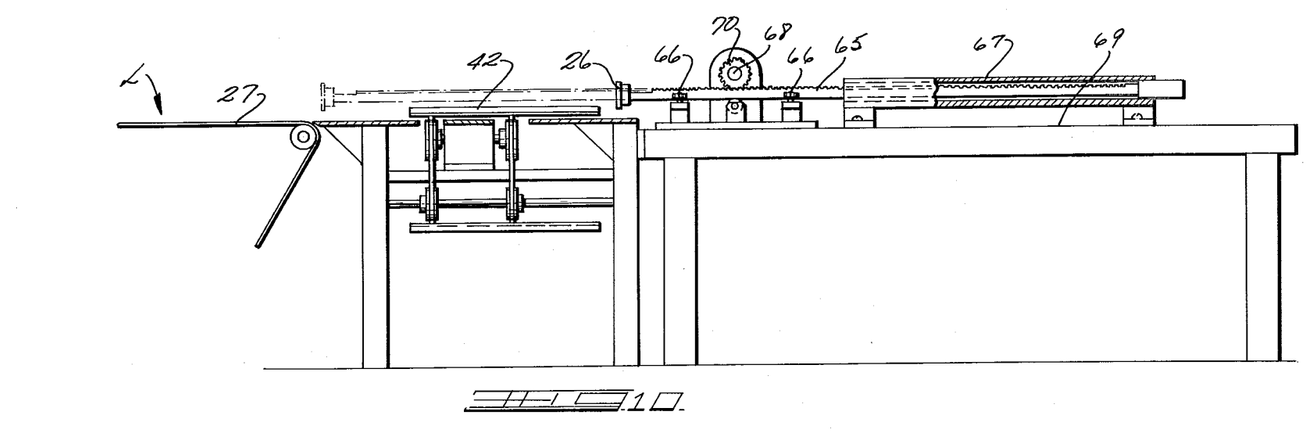
FIG. 10 is a side elevational view of the apparatus shown in FIG. 9.
Figure 11:
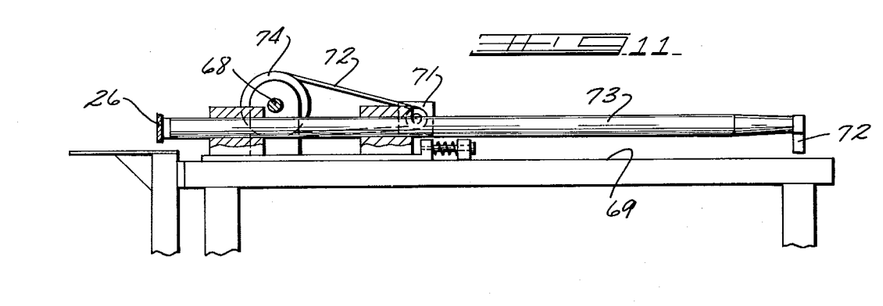
FIG. 11 is a fragmentary sectional view taken generally along the line 11—11 in FIG. 9.

When the cross conveyor 25 is operated to bring the carrier C to proper position transversely of the lehr L for engagement by pusher 26 and transfer to the lehr, the pusher 26 is operated, to transfer the carrier C to the lehr. Referring to FIGS. 9–11, pusher 26 is mounted on racks 65 which ride between rollers 66 and guides 67 on base 69. A drive shaft 68 journalled on base 69 has pinions 70 meshing with the teeth of the rack 65. The drive shaft 68 is driven by a reversible hydraulic motor 71 through a chain 72 and sprockets 73, 74. Limit switches LS9 and LS10 control the rearward and forward movement of the pusher 26.

Figure 13:
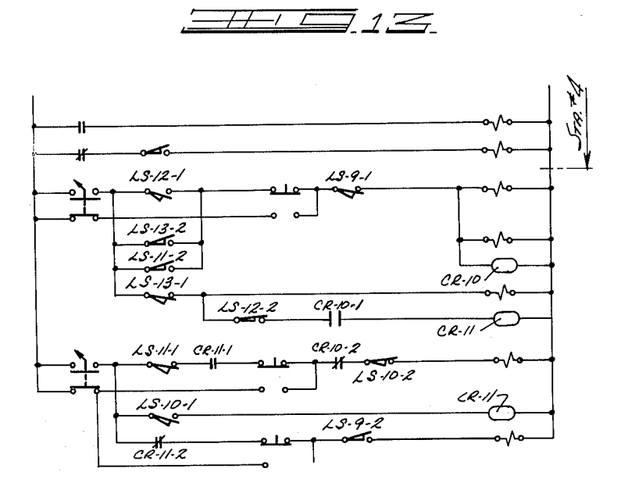
FIG. 13 is a schematic diagram of another portion of the electrical circuit utilized in the apparatus.
Figure 14:
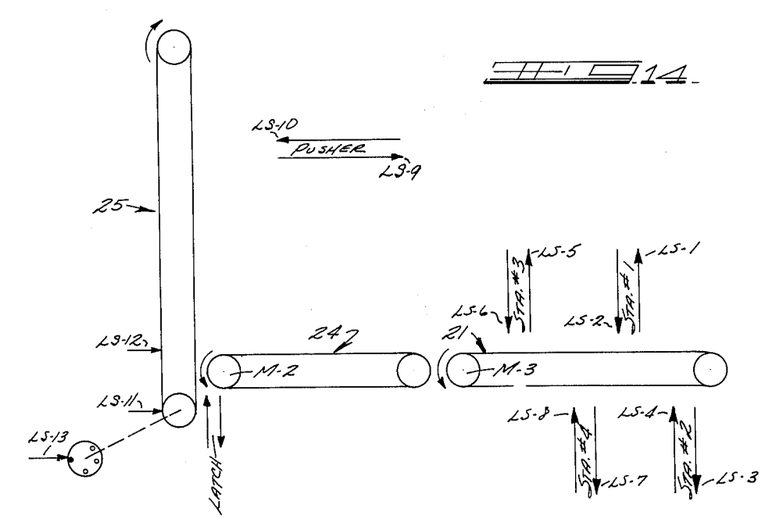
FIG. 14 is a schematic diagram of the principal limit switches and their relationship to the several conveyors used in the apparatus.

The manner in which the lehr loading apparatus is controlled and the movements of the various mechanisms are interlocked may be more readily understood by reference to the hydraulic circuit shown in FIG. 15 and the electrical circuit shown in FIG. 13.

Assuming that the cross conveyor 25 is at rest and the latch 40 is retracted, the deceleration conveyor 24 will deliver a carrier C with a television tube bulb B thereon between the flights 42 of tthe cross conveyor 25 (FIG. 5). As the carrier C reaches a position between the flight bars 42, it contacts LS12. The closing of contact LS12–1 energizes relay CR10 closing contacts CR10–1 and opening contacts CR10–2. The closing of contacts CR10–1 energizes solenoid H11 to shift valve 76 beginning the operation of cross conveyor 25. At the same time, solenoid J9 is energized to shifting valve 78 to cause cylinder 41 to move the latch 40 into position to prevent a successive carrier C from being transferred by deceleration conveyor 24 to the cross conveyor 25 while it is operating.

As the cross conveyor 25 begins to move, limit switch LS11 is released by the flight bar 42 moving away thereform thereby opening contacts LS11–1 and closing contacts LS11–2. Further as the carrier C begins to move, limit switch LS12 is released thereby opening contacts LS12–1 and closing contacts LS12–2.

Figure 8:
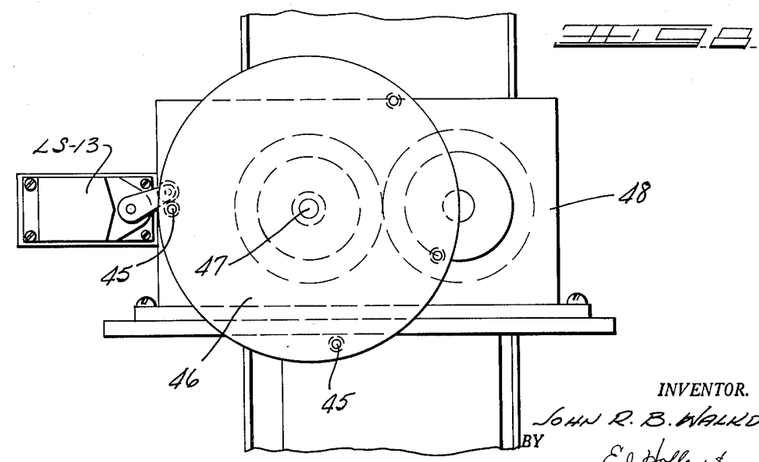
FIG. 8 is a fragmentary end view of the portion of the apparatus shown in FIG. 7.

At the same time, limit switch LS13 which is controlled by the pins 45 on timing disc 46 is released (FIG. 8) opening contacts LS13–1 and closing contacts LS13–2. The opening of contacts LS13–1 deenergizes solenoid J10 which controls the deceleration valve 75 so that the cross conveyor 25 accelerates to full speed.

As the carrier approaches its position adjacent the lehr, the next successive pin 45 on timing disc 46 actuates limit switch LS13 closing contacts LS13–1 and opening contacts LS13–2. The closing of contacts LS13–1 energizes solenoid J10 and thereby decelerates the cross conveyor 25. The closing of contacts LS13–1 also energizes relay CR11 closing contacts CR11–1 and opening contacts CR11–2. As soon as the cross conveyor 25 has moved the carrier C to its proper position laterally of the lehr belt 27, limit switch LS11 is engaged by a flight bar 42 closing contacts LS11–1 and opening contacts LS11–2 deenergizes solenoid H11 and the movement of the cross conveyor 25 is interrupted. At the same time solenoid J9 is de-energized causing the hydraulic cylinder 41 to retract the latch 40. Relay CR10 is also de-energized opening contacts CR10–1 and closing contact CR10–2.

The closing of contacts CR10–2 energizes solenoid G1–14 which provides fluid to the hydraulic motor 71 causing the pusher 26 to move outwardly. At the beginning of this movement, the cam 72 on the bar 73 fixed to the pusher 26 moves away from limit switch LS9 opening contacts LS9–1 and closing contacts LS9–2. When the pusher 26 has moved all the way across conveyor 25, transferring the carrier C to the lehr belt 27, cam 72 engages limit switch LS10 closing contacts LS10–1 and opening contacts LS10–2. The closing of contacts LS10–1 trips relay CR11 thereby opening contacts CR11–1 and closing contacts CR11–2. The opening of contacts CR11–1 deenergizes solenoid G1–14 so that the movement of the pusher 26 toward the lehr is interrupted. The closing of contacts CR11–2 energizes solenoid G1–13 to shift a control valve 77 and reverse the operation of hydraulic motor 71 to retract the pusher 26. Movement of the pusher 26 rearwardly away from the lehr opens limit switch contacts LS10–1 and closes contacts LS10–2. As the pusher 26 reaches its rearmost position, engagement of cam 72 with limit switch LS9 opens contacts LS9–2 and closes contacts LS9–1. The opening of contacts LS9–2 deenergizes solenoid G1–13 to shift valve 77 and stop the movement of the pusher 26.

In this manner the drives of the various mechanisms are interconnected with the operation of one another and with operation of the deceleration conveyor.

*Operation*

Loading conveyor 21 and deceleration conveyor 24 are driven continuously at constant speed. Pusher bars 23, cross conveyor 25 and pusher 26 are driven periodically as required.

In operation, an operator places a carrier C on a loading platform 20 adjacent pusher bar 23. As the operator removes a hot television tube bulb B from the sealing machine S, he places it on the carrier C. The operator then momentarily depresses conditioning switch 22. This energizes a holding circuit.

Timer T1 operates at predetermined intervals to energize the circuits at all loading stations where the pusher buttons 22 have been operated. When the circuit at a loading station is energized, pusher bar 23 swings the carrier C onto the conveyor belt 21. If all the pusher buttons 22 have been operated, all pusher bars 23 will swing out together. The pusher bars 23 are then returned automatically to their initial position on the platform 20.

The time interval for operation of the pusher bars 23 is determined by the time required for a carrier C to move from the loading station furthest from the lehr past the loading station nearest the lehr.

Loading conveyor 21 delivers each carrier C to deceleration conveyor 24. When cross conveyor 25 is operated, latch 40 prevents forward travel of carrier C. Latch 40 is released when the cross conveyor 25 stops.

As carrier C enters between the flights 42 of the cross conveyor 25, it operates switch LS12 which functions as a "carrier in position" switch. The cross conveyor 25 then begins to operate at slow speed to pick up the carrier C and changes to high speed when the switch LS13 is released. Cross conveyor 25 continues to run at high speed until the next pin 45 on timer disc 46 operates switch LS13. Cross conveyor 25 then operates at slow speed until a flight 42 engages switch LS11 to stop the cross conveyor 25.

The circuit for operating pusher 26 which forces the carrier C off cross conveyor 25 onto the lehr conveyor 27 is partially energized when cross conveyor 25 is running. This circuit is finally energized when switch LS11 stops cross conveyor 25. The pusher 26 is then moved forward picking up the carrier C. The operation of the pusher 26 is at slow speed under the control of deceleration valve and then accelerates to push carrier C on the lehr conveyor 27.

On completion of the forward stroke of pusher 26, limit switch LS10 reverses the movement of pusher 26. As pusher 26 returns to its initial position, switch LS9 is operated to permit cross conveyor 25 to start up again if another carrier C with bulb B thereon has been delivered to the cross conveyor 25.

I claim:
1. In an apparatus for conveying and feeding glass articles to a lehr from a forming operation, the combination comprising loading conveyor means onto which carriers supporting the articles are adapted to be moved, a plurality of loading means at longitudinally spaced points along the loading conveyor means, each said loading means comprising a platform onto which an article carrier is adapted to be positioned, means associated with each said platform for transferring the article carrier from the platform to the loading conveyor means, means at each said loading means for conditioning said transfer means for operation, means for periodically actuating said previously conditioned loading means simultaneously at all of said stations, a cross conveyor adjacent one end of said loading conveyor means onto which said article carriers are adapted to be successively moved by said loading conveyor, a lehr along said cross conveyor, and transfer means adjacent said lehr for transferring articles from said cross conveyor to said lehr, means adjacent said loading conveyor means for interrupting the movement of an article carrier thereon adjacent said cross conveyor, means responsive to the interruption of movement of said cross conveyor for disengaging said last mentioned means to permit an article to be moved by said loading conveyor means onto said cross conveyor, means responsive to the movement of an article carrier onto said cross conveyor to initiate operation of said cross conveyor, timing means operable to operate said cross conveyor for predetermined intervals of time upon actuation of said cross conveyor by movement of an article carrier thereon, means responsive to the interruption of said cross conveyor for actuating said transfer means adjacent said lehr to transfer said article carrier to said lehr.

2. The combination set forth in claim 1 wherein said loading conveyor transfer means comprises a pusher bar mounted for movement toward and away from said loading conveyor, said pusher bar having means thereon for engaging said article carrier and moving it onto said loading conveyor.

3. The combination set forth in claim 2 wherein said means for operating said pusher bar comprises a hydraulic motor, valve means for controlling the movement of said motor to operate said pusher bar toward and away from said loading conveyor, said conditioning means at each said loading means operable to condition said valve means, whereby said valve means are operated by said actuating means if said valve means have been conditioned.

4. The combination set forth in claim 3 including switch means operable upon movement of said pusher bar to a position adjacent said conveyor for reversing said valve means and returning said pusher bar to its initial position, and means responsive to the return of said pusher bar to its initial position for interrupting the flow of hydraulic fluid through said hydraulic motor.

5. The combination set forth in claim 3 including decelerator valve means in said hydraulic motor, and means operable by movement of said pusher bar to actuate said decelerator valve means and decelerate the movement of said pusher bar as it approaches its position adjacent said loading conveyor and its position adjacent said platform.

6. The combination set forth in claim 2 wherein said means for operating said pusher bar comprises a hydraulic motor, solenoid operated valve means for alternately controlling the operation of said motor to move said pusher bar toward and away from said loading conveyor means, means for conditioning said solenoid circuit of said valve means, and means for simultaneously applying electrical current to the circuits containing said solenoids for energizing said solenoids in the event said solenoid circuits have been conditioned.

7. The combination set forth in claim 6 including switch means operable upon movement of said pusher bar to a position adjacent said conveyor for reversing said solenoid operated valve means and returning said pusher bar to its initial position, and means responsive to the return of said pusher bar to its initial position for actuating said solenoid operated valve means interrupting the flow of hydraulic fluid to said hydraulic motor.

8. In an apparatus for conveying and feeding glass articles to a lehr from a forming operation, the combination comprising loading conveyor means onto which carriers supporting the articles are adapted to be moved, a plurality of loading means at longitudinally spaced points along the loading conveyor means, each said loading means comprising a platform onto which an article carrier is adapted to be positioned, means associated with each said platform for transferring the article carrier from the platform to the loading conveyor means, means at each said loading means for conditioning said transfer means for operation, means for periodically actuating said previously conditioned loading means simultaneously at all of said stations, a cross conveyor adjacent one end of said loading conveyor means onto which said article carriers are adapted to be successively moved by said loading conveyor, a lehr along said cross conveyor, and transfer means adjacent said lehr for transferring articles from said cross conveyor to said lehr, means adjacent said loading conveyor means for interrupting the movement of an article carrier thereon adjacent said cross conveyor, means responsive to the interruption of movement of said cross conveyor for disengaging said last mentioned means to permit an article to be moved by said loading conveyor means onto said cross conveyor, means responsive to the movement of an article carrier onto said cross conveyor to initiate operation of said cross conveyor, timing means operable to operate said cross conveyor for predetermined intervals of time upon actuation of said cross conveyor by movement of an article carrier thereon, means responsive to the interruption of said cross conveyor for actuating said transfer means adjacent said lehr to transfer said article carrier to said lehr, and means operable to gradually accelerate and gradually decelerate the cross conveyor as it is operated for each said predetermined interval of time.

9. In an apparatus for conveying and feeding glass articles to a lehr from a forming operation, the combination comprising loading conveyor means onto which carriers supporting the articles are adapted to be moved, a plurality of loading means at longitudinally spaced points along the loading conveyor means, each said loading means comprising a platform onto which an article carrier is adapted to be positioned, means associated with each said platform for transferring the article carrier from the platform to the loading conveyor means, means at each said loading means for conditioning said transfer means for operation, means for periodically actuating said previously conditioned loading means simultaneously at all of said stations, a cross conveyor adjacent one end of said loading conveyor means onto which said article carriers are adapted to be successively moved by said loading conveyor, a lehr along said cross conveyor, and transfer means adjacent said lehr for transferring articles from said cross conveyor to said lehr, means adjacent said loading conveyor means for interrupting the movement of an article carrier thereon adjacent said cross conveyor, and means for operating said transfer means, said carrier interruption means, and said cross conveyor in such a manner that said interruption means is actuated to permit an article carrier to be moved onto said cross conveyor only when the movement of said cross conveyor is interrupted and said transfer means is actuated to transfer an article carrier from said cross conveyor to said lehr only when the movement of the cross conveyor is interrupted.

10. In an apparatus for conveying and feeding glass articles to a lehr from a forming operation, the combination comprising a cross conveyor onto which glass articles are to be successively moved, a lehr along said cross conveyor, transfer means adjacent said lehr for transferring article carriers from said cross conveyor to said lehr, means for interrupting the movement of an article carrier onto said cross conveyor from loading conveyor means, means responsive to the interruption of movement of said cross conveyor for disengaging said last mentioned interrupting means to permit an article to be moved by said loading conveyor means onto said cross conveyor, means responsive to the movement of an article carrier onto said cross conveyor to initiate operation of said cross conveyor, timing means operable to operate said cross conveyor for predetermined intervals of time upon actuation of said cross conveyor by movement of an article carrier thereon, means responsive to the interruption of said cross conveyor for actuating said transfer means adjacent said lehr to transfer said article carrier to said lehr.

11. In an apparatus for conveying and feeding glass articles to a lehr from a forming operation, the combination comprising a cross conveyor onto which glass articles are to be successively moved, a lehr along said cross conveyor, transfer means adjacent said lehr for transferring article carriers from said cross conveyor to said lehr, loading conveyor means, means for interrupting the movement of an article carrier onto said cross conveyor from the loading conveyor means, means responsive to the interruption of movement of said cross conveyor for disengaging said last mentioned interrupting means to permit an article to be moved by said loading conveyor means onto said cross conveyor, means responsive to the movement of an article carrier onto said cross conveyor to initiate operation of said cross conveyor, timing means operable to operate said cross conveyor for predetermined successively differing intervals of time upon actuation of said cross conveyor by movement of an article carrier thereon, means responsive to the interruption of said cross conveyor for actuating said transfer means adjacent said lehr to transfer said article carrier to said lehr.

References Cited by the Examiner
UNITED STATES PATENTS

| | | | |
|---|---|---|---|
| 1,338,240 | 4/1920 | Mayers. | |
| 1,339,834 | 5/1920 | Stender. | |
| 1,954,278 | 4/1934 | Adams | 198—21 |
| 2,008,960 | 7/1935 | Lampard | 198—24 |
| 2,437,214 | 3/1948 | Tremblay. | |
| 2,722,305 | 11/1955 | McCabe | 198—24 |
| 2,736,418 | 2/1956 | Temple. | |

EVON C. BLUNK, *Primary Examiner.*

EDWARD A. SROKA, SAMUEL F. COLEMAN,
*Examiners.*